July 16, 1957     S. K. WELLMAN     2,799,603

METHOD OF MAKING CLUTCH PLATE

Original Filed Aug. 9, 1947     3 Sheets-Sheet 1

INVENTOR
SAMUEL K. WELLMAN
BY
C. Thomas Cox

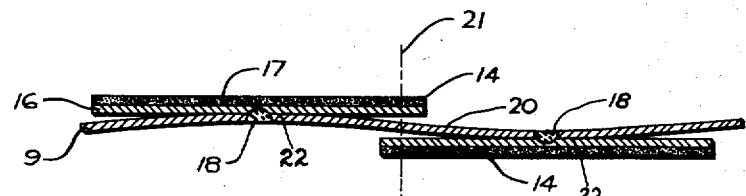
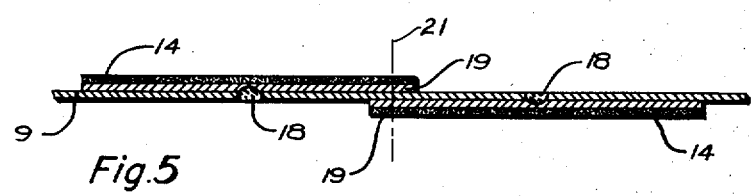
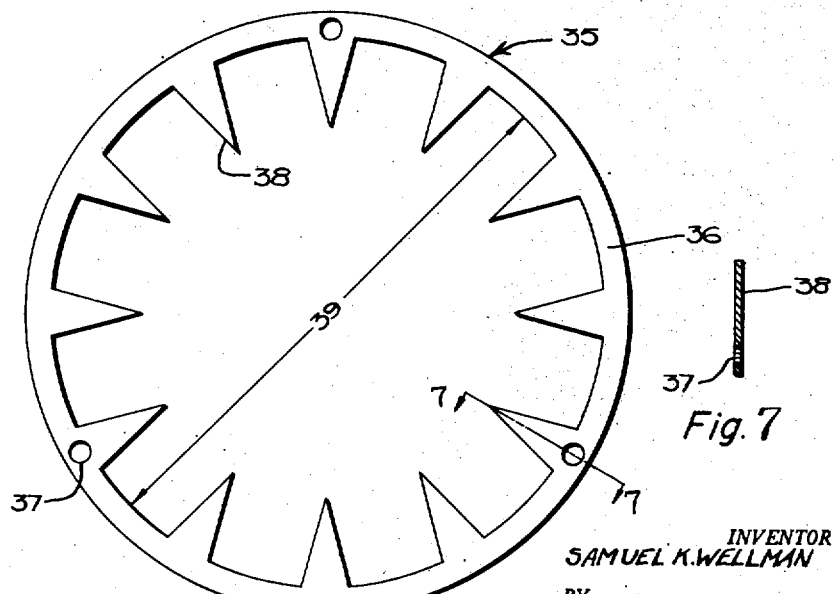

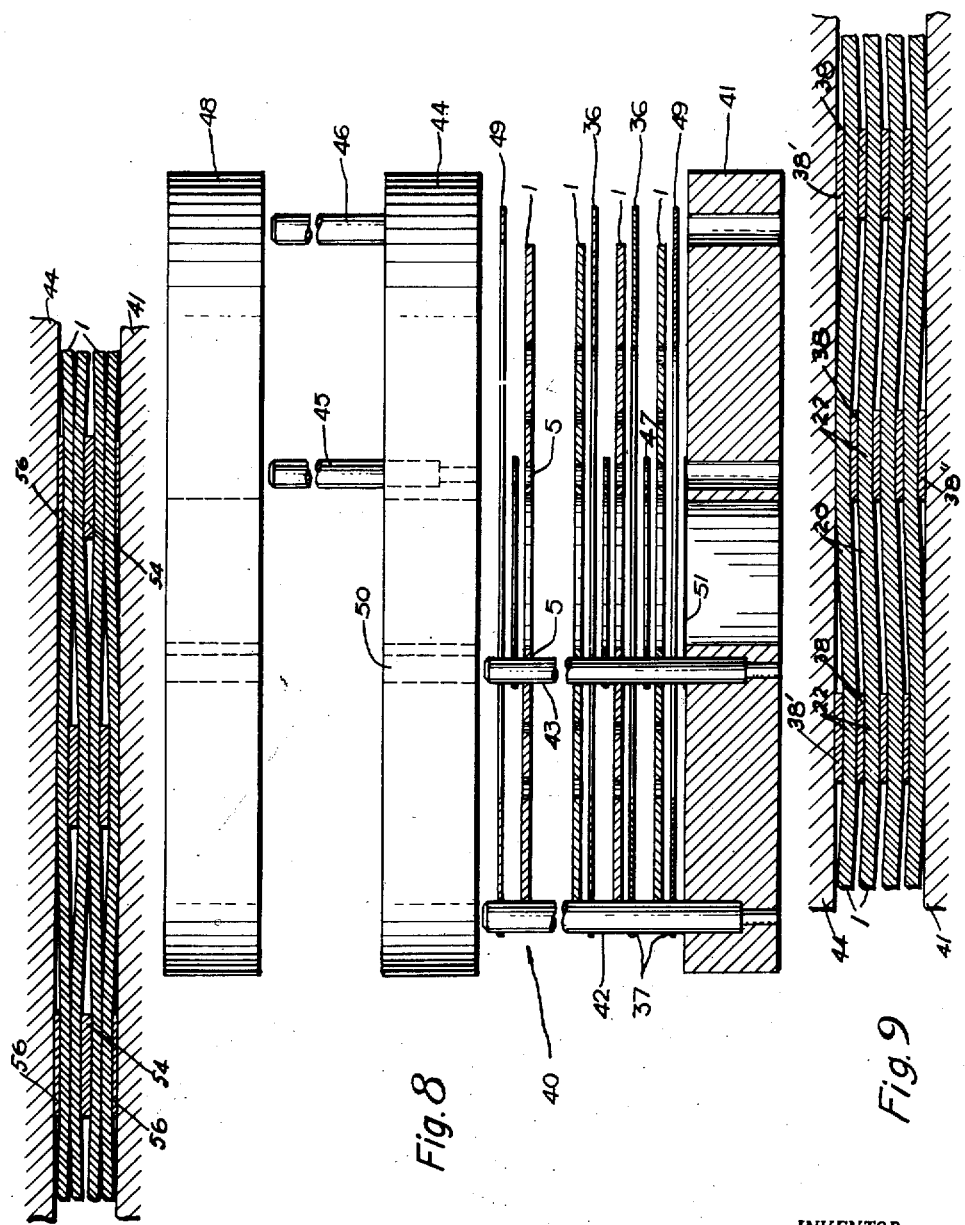

2,799,603

United States Patent Office

Patented July 16, 1957

2,799,603
METHOD OF MAKING CLUTCH PLATE

Samuel K. Wellman, Cleveland Heights, Ohio, assignor to The S. K. Wellman Company, Bedford, Ohio, a corporation of Ohio Original application August 9, 1947, Serial No. 767,706, now Patent No. 2,646,151, dated July 21, 1953. Divided and this application July 14, 1953, Serial No. 367,876

2 Claims. (Cl. 148—12.4)

This application is a division of co-pending application Serial No. 767,706 (now Patent No. 2,646,151), and relates to an improved method of making a clutch plate for use in motor vehicles and similar mechanisms wherein the clutch plate is disposed between two parts of a driving member, such as a pressure plate and a flywheel, and is adapted to be clamped therebetween in order to transmit power from the flywheel to the clutch plate. The invention relates particularly to a cushion clutch plate of the all-metal type which utilizes sintered metal friction facing material.

It is an object of the present invention to provide a new and improved method of making a cushioned clutch plate.

Other and further objects will appear from the following description in which:

Fig. 4 is a diagrammatic sectional showing of the periphery of the plate and on an enlarged scale;

Fig. 5 is a view corresponding to Fig. 4 but with the plate in compressed condition;

Fig. 6 is a plan view of a forming ring for forming the curve in the periphery of the plate;

Fig. 7 is a section on line 7—7 of Fig. 6 and on an enlarged scale;

Fig. 8 is an exploded view of the furnace fixture for forming the clutch plate to sinuous shape;

Fig. 9 is a diagrammatic vertical section on an enlarged scale of the furnace fixture of Fig. 8, but showing the same in a compressed condition; and, Fig. 10 is a view similar to Fig. 9 but illustrating a modification.

Figure 1:
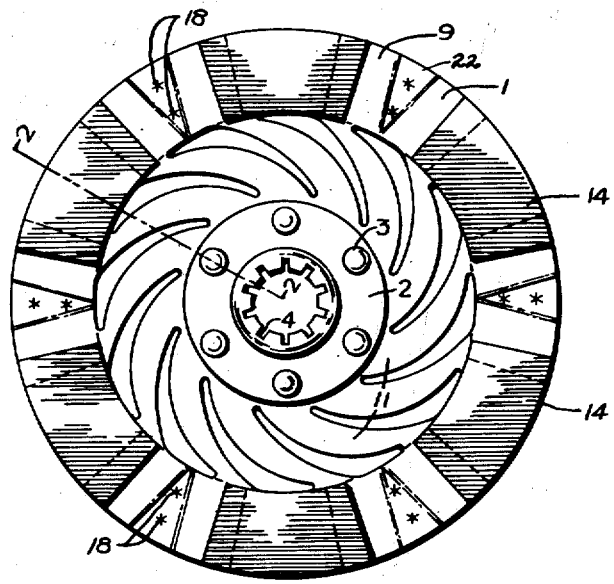
Fig. 1 represents a front elevation of the improved cushion clutch plate.

It is a recognized fact that clutch plates, particularly those for use in passenger cars, should provide some cushioning action both during the engagement operation and also during the driving operation. This cushioning action is desirable in order to obtain a smooth transmission of power during the engagement between driving and driven members as well as to provide a limited amount of cushioning action to absorb vibrations and to accommodate slight misalignments of the driving and driven members. Accordingly, clutch plates have been constructed of multipart construction and using springs to provide the desired cushioning action. For vibrational and torsional cushioning, it is common to make the plate in two or more parts as by separating the hub from the friction carrying periphery and join these parts with springs. Similarly, it has been customary to slot the periphery of the plate in the thought that this would provide a certain amount of resilience or cushioning action during the engagement of the plate. None of these expedients have been found to be entirely satisfactory in that the multipart construction increases the weight of the clutch plate with a resultant increase in its inertia and greater difficulty in shifting gears. The slotting of the periphery of the plate weakens the same and either results in failure by fracturing of the plate as between slots or in chattering of the plate during engagement.

The conventional clutch plate is provided with friction facings made of non-metallic materials usually asbestos and other ingredients in a resin or rubber base binder. These materials are not entirely satisfactory in that they are affected by heat, pressure, temperature, and liquids, such as oil and water. It is common knowledge that overheating of these plates as sometimes occurs in service has resulted in softening of the binder and destruction of the friction facings.

An improved type of friction material is that known as sintered metal friction material. This material is made by pressing and sintering a predominantly metallic mixture of metallic and non-metallic powders. The resultant product is a metallic appearing structure comprising a porous metallic network having soft metals such as lead and non-metallic such as graphite and silica disposed in the pores thereof. These sintered metal friction materials are not so subject to being affected by variations in operating conditions and are, of course, not chemically changed by contact with liquids such as oil. In certain installations, these sintered metal friction materials have been found more suitable than the conventional non-metallic material. However, due to their metallic character, they are heavier and less compressible than non-metallic materials. Their added weight has practically prevented their use in passenger automobiles. A further factor which has limited their use has been their great wear resistance in that they must be installed with great care to insure satisfactory operation. Due to this relatively little wear, the materials will not seat themselves or readily wear-in when improperly installed. It has been previously almost impossible to overcome these objections.

If the new sintered metal friction material is substituted in a conventional clutch plate having a multipart construction and compression springs, the great weight of the resultant clutch plate will prevent its use in most installations. Similarly, the incompressible nature of the material has rendered the use of peripheral slots inadequate for cushioning action and the slots make it difficult to insure that the plate and the friction segments are flat and in proper alignment. Attempts have been made to directly bond the sintered metal friction material to the carrier plate of a clutch plate. These attempts are not very satisfactory in that the heat of the bonding operation so softens or anneals the plate as to seriously reduce its strength. Thus, although a plate of slightly less weight was obtained, the plate was not satisfactory in service.

It is essential that a clutch plate be of adequate strength to withstand the stresses it receives in service. If the plate is made thick enough to avoid distortion, it is generally too heavy for use. One suggested solution is to utilize a thin coned or dish shaped plate. These have not been too satisfactory and cannot be used with sintered metal facing material and obtain satisfactory results. The sintered metal facing material, being metallic, conducts heat from the friction surface into the coned plate. Any repeated heating and cooling of a coned or dished plate quickly results in distortion and warping of the same due to the expansion of the metal thereof.

Applicant has developed a new and improved method for making a clutch plate which utilizes sintered metallic friction material and provides requisite cushioning action during engagement and torsional resilience to absorb vibrations and accommodate shaft misalignments. The invention relates particularly to a cushioned clutch plate of the all-metal type which is flat and which comprises a flat center portion carrying a hub and a peripheral portion joined to the hub by spaced spokes. Friction segments are secured to the peripheral portion in a spaced and staggered manner and the whole is constructed so that the requisite cushioning action is provided without excessive weight. The invention will be more clearly understood by reference to the following description.

Figure 2:
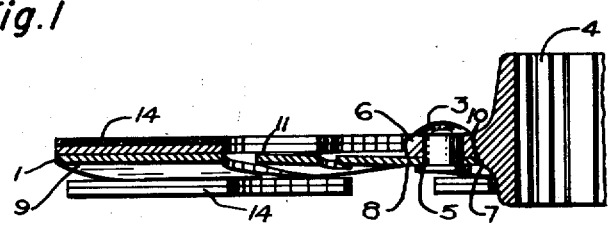
Fig. 2 is a section on line 2—2 of Fig. 1 and on an enlarged scale.

Fig. 1 shows a clutch plate constructed in accordance with the invention and comprising a carrier plate 1 secured at the center thereof to a flanged hub 2 by means of rivets 3 extending through rivet holes 5 in the carrier plate 1. As shown in Fig. 2, the hub 2 is provided with a central splined opening 4 for reception of the usual splined shaft. The hub 2 fits in a hole 10 of the plate and is provided with a flange 6 having a shoulder 7 against which the center portion 8 of the carrier plate 1 fits and to which it is secured by means of the rivets 3.

The center portion 8 of the carrier plate 1 which abuts the flange 6 of the hub 2 is flat as shown in Fig. 2 and is secured to the peripheral portion 9 of the carrier plate 1 by means of the spokes 11 which are of generally spiral shape. As shown in the enlarged view of Fig. 3, the spokes 11 are formed by the cut-outs or slots 12. These slots are of gradually increasing width in a radially outward direction thus causing the spokes to be of a decreasing width outwardly. The ends of the slots 12 are provided with smoothly rounded corners 13 so as to avoid the formation of sharp corners and the resultant localization of stresses.

Figure 3:
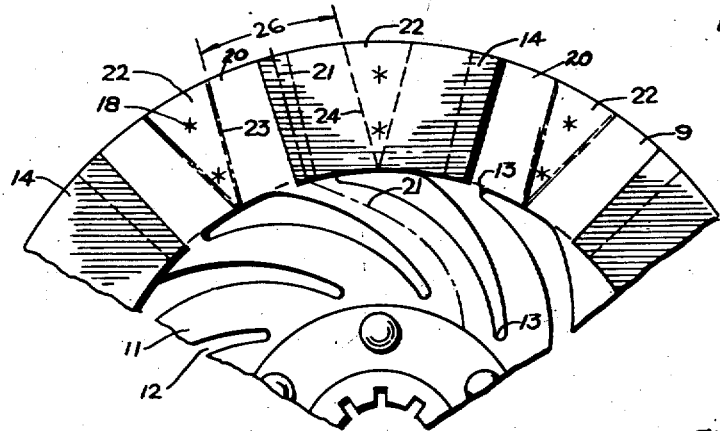
Fig. 3 shows a portion of the clutch plate of Fig. 1 on an enlarged scale.

As will be seen from Fig. 3, the peripheral portion 9 of the carrier plate 1 is of wave shape and is formed of a plurality of flat triangular portions or areas 22 joined by spring portions 20 so as to form a sinuous or somewhat wave-like shape in a circumferential direction. The flat portions or areas 22 form flattened crests on the waves. The spring portions 20 are of smoothly curved form and comprise spring sections joining the flat triangular portions 22. As shown in Figs. 1 and 3, these flat triangular portions or areas 22 are located at the center of the friction segments and extend radially across the peripheral portion 9 of the clutch plate.

Friction pads or segments 14 are secured to the peripheral portion 9 of the plate in spaced relation, each pad being secured at its center to the top of a triangular portion and in alternate arrangement on opposite sides of the plate. In the arrangement shown in Fig. 1, it will be observed that there are six segments secured to each side of the plate and that the segments on one side are in staggered relation with respect to the segments on the other side of the plate. It is further shown in Fig. 1 that since staggered segments 14 are used, there must always be an even number of segments; therefore there must also always be an even number of spokes 11. In addition, the segments overlap in a peripheral direction.

The arrangement of the segments on the curved periphery 9 of the plate can be more easily understood from reference to Figs. 4 and 5. It will be seen that each segment 14 comprises a steel backing member 16 having integrally bonded thereto a sintered metal facing material 17 constructed in a manner described hereinafter. The curved peripheral portion 9 of the carrier plate is formed of flat portions 22 (the triangular areas) joined by spring portions 20 as described above and the friction segments 14 are secured thereto at the flat portions by welding as indicated at 18. Preferably, projection welding is utilized. In this type of welding, the peripheral portion 9 of the plate is provided with a small projection or raised portion at the spot where it is desired to secure the segment. The segment 14 is then placed on this projection and electrodes placed on the opposite sides of the segment 14 and plate 1. When a suitable electric current is passed between the electrodes, the projection localizes the passage of current, fuses and forms a strong weld. As is shown in Fig. 1, we have illustrated the use of two projection welding points 18 for each segment, but it is apparent that this may be modified and other attaching means, such as rivets, could be used.

The form of the peripheral portion of the plate is of importance. Fig. 4 diagrammatically shows the plate in uncompressed condition while Fig. 5 shows it in the position it assumes when fully compressed between the pressure plate and the flywheel of a motor vehicle. It will be seen that the spring portions 20 of the plate have been flattened during the compression. The overlapping portions 19, see Fig. 5, of the segments 14 prevent distortion of the peripheral portion beyond the flattened position. It will be understood that Fig. 5 is diagrammatic. The showing in this figure assumes that the peripheral portion of the carrier plate has been straightened. It represents the results if a rectangular strip of steel were being used.

The peripheral portion 9 of the plate will not be stressed beyond its elastic limit because there is no sharp bend during the compressing operation. The compressing step merely gradually flattens the peripheral portion. There is some compression of the steel during this, but of negligible amount. The length of the peripheral portion between adjacent edges of adjacent triangular areas of the segments shown in Fig. 4 forms a spring portion 20. It will be noticed that this spring portion is of constantly decreasing length as the plate is depressed and flattened. This constantly decreasing length of the spring results in a constantly increasing strength of the spring. In other words, the force required to compress the spring increases greatly as the spring is compressed.

The spokes 11 are so arranged as to minimize undue flexing during the compression of the plate. In Figs. 3, 4, and 5, the dotted line 21 designates the neutral plane of the spoke 11 and the attached spring section 20. Theoretically, the peripheral portion 9 of the plate at this point does not move during compression. In compression, the portion of the spring 20 to the left of this dotted line is bent down (Fig. 4) and the portion to the right is bent up. To avoid undue distortion or flexing of the spokes 11 of the plate, they connect to the peripheral portion of the plate in the neutral plane or line 21 of each spring portion 20 as is evident from Fig. 3. As a result of this, although the plate may be compressed repeatedly, the spokes are not subject to flexing or distortion to any appreciable extent and will not fail due to fatigue. They are, however, free to flex to cushion vibration and accommodate misalignment between driving and driven members. Their attachment to the peripheral portion at the neutral plane serves to greatly reduce the amount of flexing to which they are subjected and minimizes fatigue problems.

The spokes 11 are of generally spiral shape in order to obtain great length. The use of a spiral spoke of this type permits a spoke length approximately twice that which would be obtained if a radial spoke were used. This greater length of the spokes 11 permits a spoke of greater cross-section and increased strength to be used while at the same time retaining the resilient construction. If radial spokes were used, the greatly reduced length thereof would necessitate the use of very narrow spokes in order to obtain the same degree of spring action in the plate. Such small spokes would be much more subject to failure in service.

Another important feature of the improved clutch plate is that the spring pressure or force required to compress the plate is substantially uniform over the face of each segment. As will be observed from Figs. 1 and 3, the segments 14 contact the curved peripheral portion 9 on a flat triangular area 22. The adjacent edges 23 and 24 of the adjacent triangular areas are parallel as shown in Fig. 3. Thus, the distance 26 between parallel lines represents the spring portion 20 shown in Figs. 4 and 5. Since this spring portion has the same length at its outer periphery as at its inner periphery, it is apparent that the pressure required to compress the spring portion will be uniform over the segments 14, since the steel backing 16 thereof is sufficiently strong and stiff to resist bending.

The spokes 11 serve to give torsional resilience to the plate and function in the same manner as the usual helical compression springs used in multipart clutch plates to absorb vibration and to permit a limited amount of axial misalignment between the driving and driven members.

As one example, I have constructed the clutch plate shown in Fig. 1 with an outside diameter of 9 inches and a peripheral portion 9 having a radial width of about 1⅜ inches. The segments 14 had an outside peripheral chord length of 2¾ inches. The carrier plate 1 was made of SAE 1035 steel of a thickness of .070 inch and hardened and drawn to a Rockwell C hardness of 20–25. The segments 14 had a steel backing of SAE 1010 composition and a thickness of .062 inch and a facing $\frac{3}{32}$ inch thick of a composition described below. The spring portions 20 of the peripheral portion 9 of the plate had a length of about 1½ inches and a compressive height of .040 inch. A force of 1500 pounds was required to fully compress this plate.

Generally, the clutch plate 1 should be installed so that the direction of rotation of the plate is such that the spokes 11 are placed in tension when a driving force is applied. However, opinions differ as to whether the spokes should be in tension or compression during acceleration. Where the clutch plate is used in heavy trucks in hilly locations where the engine is used for braking the truck on steep grades, it has been suggested that the plate should be installed so that the spokes are in tension during this deceleration or braking action.

The method of constructing a clutch plate, such as that shown in Fig. 1, comprises the assembly of the various parts. As has been described the clutch plate comprises a hub 2, a carrier plate 1, and twelve friction segments 14 (in the modification shown). The hub 2 is of conventional construction and is generally made by machining a steel forging. The carrier plate 1 is formed by stamping a flat plate from a sheet or strip of steel of suitable composition and thickness. I have found it preferable to use SAE 1035 steel. This should be of cold-rolled type since thickness variations are small with steel of that type. The plate is formed to the desired shape and configuration in a manner to be described hereinafter. The friction segments 14 are also produced in a manner to be described later. The carrier plate 1 is secured to the hub 2 by means of rivets 3 and friction segments 14 are then secured to the peripheral portions 9 of the carrier plate 1 by means of projection welding as described above or some other method. The resulting plate is then balanced and is ready for use. In some cases it may be necessary to grind the friction surfaces of the friction segments 14 to insure accurate alignment.

The formation of the curved carrier plate of Figs. 1 through 5 is somewhat involved. This plate should be heated, quenched and stress-relieved in order to achieve the proper characteristics. This must be done in a manner which will insure accurate formation of the curved periphery.

The carrier plate of Fig. 1 may be formed by stamping from flat steel of suitable thickness and composition, a plate of the general form shown in Fig. 1 having slots 12, rivet holes 5 and a central cut-out 10 for reception of the hub. After the plate has been stamped to shape, it should be hardened by heating to a temperature above the critical point and quenched in oil or other suitable medium while clamped in a fixture that will form the convolutions or bends in the peripheral portion of the plate. A temperature of about 1550° F. is satisfactory. Quenching fixtures are common and are frequently used for the quenching to shape of springs of various shapes and it has not been deemed necessary to show this apparatus.

The resultant curved plates will not be of uniform curve. In other words, the peripheral portion of each plate will not have exactly uniform shape nor will the curves of successive plates correspond due to the inherent difficulties of controlling the clamping operation and the flow of cooling fluid. It is essential that these curves be uniform not only to secure uniform compressible action but to insure that the friction segments 14 when secured to the plate will have their outer surfaces in the same plane on each side of the plate and that the faces on one side will be parallel to the faces on the other side. It will be readily appreciated that since these segments are relatively long and are secured only at their centers, a slight tilting of the flat triangular area 22 of the peripheral portion of the plate will result in a considerable elevation of the end of the segment above the desired plane. A clutch plate in which the outer faces of the segments are not in the same plane and which has raised corners on the segments will chatter and vibrate in use and will not be satisfactory. To achieve uniform curving of the peripheral portion of the plate, I have devised the expedient of drawing the hardened plate in the special fixture shown in Figs. 6 through 8.

After the plate has been heated and quenched in oil to harden the same, it is curved to the general shape desired but is in a hard and stressed condition. It is desirable to heat the plate to a drawing or stress relieving temperature before placing it in use. I propose to utilize this drawing operation to finally form the desired convolutions in the periphery of the plate. This is accomplished by use of forming rings 35 such as shown in Fig. 6 and the fixture 40 of Fig. 8. The ring 35 comprises a peripheral portion 36 having three spaced holes 37 and twelve triangular members or portions 38. The inside diameter 39 of the peripheral portion 36 of the ring is slightly greater than the outside diameter of the carrier plate 1. The triangular segments 38 are so shaped and arranged as to correspond with the triangular portions 22 in the peripheral portion of the plate.

A plurality of forming rings 35 and carrier plates 1 are assembled on the fixture 40 shown in Fig. 8 which comprises a thick cast iron base plate 41 having three vertical pins 42 spaced about the outer periphery thereof for guiding the forming rings 35 by extending through the holes 37 and three vertical spaced pins 43 located at the inner periphery thereof for guiding the carrier plates by extending through the rivet holes 5. For clarity, only one pin 42 and one pin 43 are shown. These pins extend upwardly and are adapted to be received in holes 50 in an upper cast iron plate 44. Downward movement of plate 44 forces an assembly of carrier plates and forming rings against the lower plate. The upper plate 44 is in turn provided with three spaced pins 45 and three spaced pins 46 for reception of carrier plates and forming rings. A still further cast iron plate 48 is provided for placement on the pins 45 and 46. It will be readily seen that although only two complete units comprising three plates are shown, a plurality of units may be superimposed. The completed stack of assembled units is adapted to be placed in a furnace, held under pressure, and heated to a temperature sufficient to relieve the stresses in the carrier plates and to form them to the desired shape. I have found it preferable to use a furnace such as that shown in Wellman Patent No. 2,258,431, issued October 7, 1941, but any furnace can be used which is adapted to hold the assembled stack under pressure while heating the same.

In order to properly form the carrier plates, they are assembled with the forming rings generally shown at 35 in Fig. 6. It will be seen that the carrier plates 1 are of slightly less diameter than the space between the pins 42 and that the rivet holes 5 in the carrier plates receive the pins 43. Holes 37 in the forming rings 35 receive the pins 42. The pins 42 and 43 are so located that the triangular portions 38 of the forming rings 35 are accurately aligned with the desired triangular portions 22 of the carrier plates 1.

Since the central portion 8 of the carrier plate is flat, it is necessary to provide flat spaced rings or washers to maintain the same in flat condition. These are shown in Fig. 8 at 47. In order to achieve inclined spring portions having a height such as to permit a compression of .040 inch, the forming rings 35 and washers 47 should have a thickness of .040 inch. However, the bottom and top washers 51 must obviously have a thickness of half this or .020 inch due to the flat and parallel faces of the cast iron plates 41 and 44. Similarly, the bottom and top forming ring 49 should have only six instead of twelve triangular portions. The top ring should have its triangular portions offset by 30° from those of the bottom ring.

The arrangement and operation of the forming rings 35 and the fixture 40 can best be understood by reference to the schematic showing of Fig. 9. This figure shows a plurality of carrier plates 1 clamped between the heavy cast iron plates 41 and 44. This view shows a section of the periphery of the carrier plates in a manner similar to that of Figs. 4 through 5. As in those figures, the diagrammatic showing is made in a manner to best illustrate the curved nature of the periphery and the showing is somewhat similar to that obtained if a series of straight plates were used rather than peripheral portions of a circular object. It will be noticed that the peripheral portions of the carrier plates 1 have been formed to curved shape comprising flat areas 22 joined by inclined spring portions 20. This curvature is obtained by use of the triangular portions 38 which are disposed between the carrier plates 1 in such a manner that compression between parallel cast iron plates 41 and 44 results in bending of the carrier plates. It will be seen that portions 38 of the same forming ring 35 are distorted by this action. It will be also noted that the triangular portions 38' of the top forming ring 49 and the triangular portions 38'' of the lower forming ring 49 are offset 30° and that the bottom and top forming rings use only six or one-half as many triangular portions as the central forming rings.

After the forming rings, washers, and carrier plates are assembled between the cast iron plates 41, 44, and 48, the assembled unit is placed in a furnace such as that described above and heated to a sufficient temperature to relieve stresses in the carrier plates and form the peripheral portions to the desired contour. I have found it preferable in treating a carrier plate constructed as described above to press the assembly under a pressure of 100 pounds per square inch and heat the same to a temperature of about 1000° F. and then allow the assembly to cool in the furnace.

The carrier plates when removed from the furnace after the above treatment have accurately formed peripheral portions and center portions that are flat and in alignment. The plate itself should have a hardness of Rockwell C 20-25.

While I have described the use of SAE 1035 steel for the carrier plate and the formation of the wave shape in the periphery as being first done in a hardening step followed by a drawing step, it is clear that other steels can be used and that the process may be varied. For example, a steel of higher carbon content such as SAE 1070 steel may be used. This steel, if in cold rolled condition, is sufficiently strong so that no hardening is necessary for some applications. In that case, the heating and quenching steps are omitted and the periphery is formed merely through use of the forming apparatus shown in Figs. 6 to 8. A heating step using this apparatus in the manner previously described results in the formation of the waves as well as the relieving of any stresses in the plate such as those caused by the operation of stamping the plate from a sheet of steel. The heating and forming step is accomplished at a temperature not sufficiently high to reduce the strength of the plate below acceptable limits.

After the carrier plate is properly formed, it is secured to the machined hub 2 by means of the rivets 3.

The friction segments 14 are prepared in any manner well-known in the art, but I prefer to prepare them by first suitably preparing the steel backing members 16. These backing members are cleaned and then provided with a thin plating of a protective metal, such as copper or nickel. The friction facing material 17 is prepared by pressing to desired shape a suitable mixture of metallic and non-metallic powders to form a flat briquette. This briquette is then placed on the plated backing member 16 and pressed against the same under a pressure of approximately 100 pounds per square inch while being heated to a sufficient temperature to sinter the facing material and cause it to integrally bond to the steel backing member. As one example, I have used a facing material comprising:

| | Percent by weight |
|---|---|
| Cu | 67.26 |
| Sn | 5.31 |
| Pb | 8.72 |
| Fe | 7.20 |
| Graphite | 7.08 |
| Silica | 4.42 |

This mixture is pressed under a pressure of 11 tons per square inch to form the briquette. It is sintered at a temperature of approximately 1450° F.

The segments 14 can be made to the desired shape or they may be cut from a larger piece of material. It is apparent that the segments shown could be cut from a ring-shaped piece of material.

The segments are secured to the carrier plate in the desired position by means of the projection welds 18 or other suitable means as described above.

The resultant clutch plate is of considerably less weight than any prior metallic plate using sintered metal facing material and is constructed in such a manner as to have a cushioning or spring action both axially and circumferentially. The waved peripheral portion serves to give resilience and a cushion-like action during the engagement of the plate and the spokes 11 serve to give a torsional spring action to the plate. Furthermore, the waved periphery of the plate and the slots 12 forming the spokes 11 together with the spaced feature of the segments serve to cause a rotating clutch plate to act as a fan and circulate air over the plate and cool it. If the plate is operated in a liquid, such as oil, the liquid will be circulated by the rotation of the plate and will serve to cool the same.

The spring portions 20 between the adjacent edges of the adjacent flat areas of the peripheral portion are each of uniform length as described above and serve to insure that the friction surfaces of the segments 14 will receive uniform pressure and thus will wear in a uniform manner. Obviously the strength of these spring portions is controlled by their dimensions. Thus, the spring strength of the plate or the pressure required to fully compress the same from the position shown in Fig. 4 to that shown in Fig. 5 can be controlled by varying the thickness and dimensions of the carrier plate and spring portions 20 and by varying the number of friction segments used. By varying the distance between the adjacent edges of the flat areas as by changing the size of these areas, the spring strength can also be varied. In the embodiment shown, these areas are of triangular shape and a pressure of about 1500 pounds is required to fully compress the plate. It is apparent that these areas may be of other shape. For example, they may be of truncated triangular shape. It is merely essential that each area extend radially entirely across the peripheral portion of the plate and that adjacent edges of adjacent areas be parallel so that the spring portion therebetween is of uniform length.

The forming ring 35 shown in Fig. 6 could obviously be constructed in other ways. It is apparent that the peripheral portion 36 merely serves to hold the triangular areas 38 in desired position. Actually a plurality of separate triangular or truncated triangular pieces 38 could be used. However, the construction shown in Fig. 6 is preferable in that it facilitates assembly of the various parts for the forming operation.

The set-up of the fixture 40 in Fig. 8 entails some distortion of the forming rings 35 during the heating operation. It is apparent from Fig. 9 that the triangular portions 38 of a ring are alternatively displaced. This may be avoided by utilizing the arrangement shown in Fig. 10. In this modification, the carrier plates 1 are also shown as clamped between the heavy cast iron plates 41 and 44 and triangular areas are used to create the desired curvature. In this construction, the intermediate forming rings are provided with only six triangular areas 54, but these are of twice the thickness of the trangular areas 38 of the ring shown in Figs. 6 and 9. Thus, for the clutch plate shown having a maximum compression of .040", these triangular areas would have a thickness of .080". The triangular portions 56 of the top and bottom forming rings should have a thickness of one-half of this, or .040". All of the forming rings of this modification have only six triangular portions, but it will be observed that the locating holes are so arranged that the triangular areas of adjacent rings are staggered by 30°. Thus, while the carrier plates in the modification of Fig. 9 are all bent parallel, the carrier plates in Fig. 10 are alternatively bent up and down. The modification of Fig. 10 has the advantage that the triangular portions 54 and 56 of each forming ring are not bent or distorted. This results in a somewhat longer life of the forming rings.

Although I have illustrated and described specific methods of making specific clutch plates, it is apparent that the invention is not limited to the specific methods or forms of construction illustrated, but may be embodied as well in other methods to provide other forms of construction within the scope of the appended claims.

I claim:

1. The method of making a plurality of identical circular friction clutch plates comprising the steps of stamping from sheet steel a plurality of flat annular plates each having a central portion, an outer peripheral portion, and spokes extending between the central and outer portions, forming convolutions between peripherally spaced triangular shaped flat areas in the outer peripheral portion of each plate adjacent the outer ends of slots between said spokes by hardening the plate by heating it to about 1550° F., quenching the heated plate in oil while clamped in a fixture to form the plate in the general shape of the desired finished clutch plate, arranging said plurality of plates axially in a stack alternately with substantially flat forming washer members interposed between adjacent plates in the stack, each of said members having a substantially solid outer peripheral portion of a diameter slightly greater than the outer diameter of each plate and having radially inwardly projecting triangular portions designed to mate with at least half of the triangular shaped flat areas of the adjacent plate, accurately aligning the triangular portions of said plates and washer members, compressing the stack to cause said triangular portions of the members to displace the triangular shaped flat areas of the plates axially in the stack to form accurately the desired convolutions between the adjacent triangular shaped flat areas of each plate, placing the stack in a furnace and heating it to a temperature of about 1000° F. sufficient to relieve stresses in the plates while the peripheral portions of the plates are formed with said convolutions, then cooling the stack and separating the plates and members.

2. The method of making a plurality of identical circular friction clutch plates each comprising a flat central area and a peripheral area having an unbroken outer edge and an even number of circumferentially spaced flat portions with adjacent portions axially staggered so that each alternate flat portion lies in the same plane and all the flat portions comprise two sets lying in axially spaced planes, adjacent flat portions being joined by connecting portions of waved shape, said central and peripheral areas being connected by spokes, said method comprising stamping from sheet steel a plurality of generally flat plates each having said central and peripheral areas and spokes and having its peripheral area formed to aproximately the desired waved shape, hardening each plate by heating and quenching while clamped in a fixture to fix the plate in said shape, then forming said connecting portions of each of the plates accurately in the desired waved shape by assembling said plates axially in a stack and interposing a deforming pressure member between the adjacent surfaces of each contiguous pair of plates in the stack, each of said members being of circular shape and having a peripheral portion including circumferentially spaced areas separated by intervening gaps and said members being arranged in the stack with said areas and gaps of axially adjacent members staggered circumferentially around the plates so that circumferentially adjacent connecting portions of the peripheral area of each plate are forced into axially spaced planes when the stack is compressed, then compressing the stack, heating the stack to relieve stresses in the plates, and then allowing the plates to cool with said connecting portions set in waved shape.

References Cited in the file of this patent

UNITED STATES PATENTS

| 1,431,680 | Petersen | Oct. 10, 1922 |
| 1,535,191 | Wemp | Apr. 28, 1925 |
| 2,417,610 | Phillips | Mar. 18, 1947 |
| 2,646,151 | Wellman et al. | July 21, 1953 |